(12) United States Patent  
Purtteman et al.

(10) Patent No.: US 12,413,333 B2  
(45) Date of Patent: Sep. 9, 2025

(54) COMMUNICATIONS DEVICES, COMMUNICATIONS SYSTEMS AND ASSOCIATED COMMUNICATIONS METHODS

(71) Applicant: OptimERA Holdings, Inc., Dutch Harbor, AK (US)

(72) Inventors: Jester JP Purtteman, Olympia, WA (US); Emmett J. Fitch, Olympia, WA (US)

(73) Assignee: OptimERA Holdings, Inc., Dutch Harbor, AK (US)

(*) Notice: Subject to any disclaimer, the term of this patent is extended or adjusted under 35 U.S.C. 154(b) by 0 days.

(21) Appl. No.: 17/835,679

(22) Filed: Jun. 8, 2022

(65) Prior Publication Data

US 2022/0399953 A1    Dec. 15, 2022

Related U.S. Application Data

(60) Provisional application No. 63/208,657, filed on Jun. 9, 2021.

(51) Int. Cl.
*H04B 3/46* (2015.01)
*H04L 1/00* (2006.01)
(Continued)

(52) U.S. Cl.
CPC .......... *H04L 1/0009* (2013.01); *H04L 1/0003* (2013.01); *H04L 41/0677* (2013.01);
(Continued)

(58) Field of Classification Search
CPC . H04L 1/0009; H04L 1/0003; H04L 41/0677; H04L 41/16; H04L 43/0847; H04L 1/20; H04Q 9/00
(Continued)

(56) References Cited

U.S. PATENT DOCUMENTS 8,411,786 B1 * 4/2013 Song ............... H04L 1/0036  
375/267  
10,476,628 B2   11/2019 Yom  
(Continued)

FOREIGN PATENT DOCUMENTS

WO     WO WO         4/2020  
       2020/064134  
WO            WO        11/2023  
PCT/US2022/032696

OTHER PUBLICATIONS

Hardesty, "Explained: The Shannon Limit", available online at https://news.mit.edu/2010/explained-shannon-0115, Jan. 19, 2010, 3 pages.

(Continued)

*Primary Examiner* — Helene E Tayong  
(74) *Attorney, Agent, or Firm* — Wells St. John P.S.

(57) ABSTRACT

Communications devices, communications systems and associated communications methods are described. According to one aspect, a communications device includes processing circuitry configured to access a value indicative of a signal to noise ratio of a communications signal received at a second communications device of a communications system after transmission of the communications signal from a first communications device of the communications system at a first moment in time, select one of a plurality of different adjustments, and use the value and the one adjustment to control a communications parameter of the communications signal transmitted at a second moment in time after the first moment in time.

35 Claims, 11 Drawing Sheets

(51) Int. Cl.
   *H04L 41/0677* (2022.01)
   *H04L 41/16* (2022.01)
   *H04L 43/0823* (2022.01)
   *H04Q 9/00* (2006.01)
(52) U.S. Cl.
   CPC .......... *H04L 41/16* (2013.01); *H04L 43/0847* (2013.01); *H04Q 9/00* (2013.01)
(58) Field of Classification Search
   USPC ....................................................... 375/227
   See application file for complete search history.

(56) References Cited

U.S. PATENT DOCUMENTS

| | | | |
|---|---|---|---|
| 10,749,594 | B1 | 8/2020 | O'Shea et al. |
| 11,418,270 | B2 | 8/2022 | Veijalainen et al. |
| 11,811,489 | B2 | 11/2023 | Hultman et al. |
| 2007/0149126 | A1* | 6/2007 | Rangan ................ H04B 17/336 455/63.1 |
| 2012/0008940 | A1 | 1/2012 | De Lind Van Wijngaarden |
| 2012/0106664 | A1* | 5/2012 | Bonicatto ................ H04B 3/54 375/260 |
| 2017/0110795 | A1 | 4/2017 | Henry et al. |
| 2019/0207672 | A1 | 7/2019 | Arora et al. |
| 2019/0253976 | A1 | 8/2019 | Pelletier et al. |
| 2019/0319868 | A1 | 10/2019 | Svennebring et al. |
| 2020/0343985 | A1 | 10/2020 | O'Shea et al. |
| 2021/0075526 | A1 | 3/2021 | Pefkianakis et al. |
| 2021/0320732 | A1 | 10/2021 | Croke et al. |
| 2022/0021469 | A1 | 1/2022 | Veijalainen et al. |

OTHER PUBLICATIONS

Purtteman et al., U.S. Appl. No. 63/208,657, filed Jun. 9, 2021, titled "Modulation and Coding Scheme Prediction System and Associated Methods", 21 pages.

Wikipedia, "Shannon-Hartley Theorum", available online at https://en.wikipedia.org/wiki/Shannon%E2%80%93Hartley_theorem, Jan. 26, 2021, 5 pages.

* cited by examiner

COMMUNICATIONS DEVICES, COMMUNICATIONS SYSTEMS AND ASSOCIATED COMMUNICATIONS METHODS

RELATED PATENT DATA

This application claims the benefit of U.S. Provisional Patent Application Ser. No. 63/208,657, filed Jun. 9, 2021, entitled "Modulation and Coding Scheme Prediction System and Associated Methods," the disclosure of which is incorporated herein by reference.

TECHNICAL FIELD

This disclosure relates to communications devices, communications systems and associated communications methods.

BACKGROUND OF THE DISCLOSURE

In any given medium (i.e., water, glass, air, electrical conductors, etc.) there are a limited set of frequencies of electromagnetic radiation that will efficiently transmit. Most digital communications are achieved by modulating one or more properties of a periodic carrier signal, for example shifting the frequency by some detectable amount at one terminal and transmitting it through such a medium to a remote terminal. The remote terminal records the carrier signal and determines the message encoded by the modulator in a process called demodulation. The device that performs the modulation/demodulation is called the modulator/demodulator or commonly, a modem.

Referring to FIG. 1, an ideal communications system 10 is shown including a communications link 12 between a plurality of terminals 14, 16. Signals communicated via communications link 12 between terminals 14, 16 may be modulated according to numerous systems, for example including Amplitude Shift Keying (ASK), Frequency Shift Keying (FSK), Phase Shift Keying (PSK), and Amplitude and Phase Shift Keying (APSK).

The quality of the received signal greatly impacts the granularity with which measurements of these keying systems can be made. The spectral efficiency of the communications link is defined as the number of bits of data that can be transmitted per hertz of spectrum that is allocated using one of the keying systems and is typically reported in bits/Hz. One way that efficiency is limited is by how many discrete states can be readily identified per cycle of the clock. The signal at the demodulator is readable to at least $2^b$ divisions where 'b' is the bits/Hz of the modulation. Accordingly, a carrier encoded with 4 bits/Hz using the APSK system is modulated to 16APSK since $2^4$ is 16 divisions.

Signals communicated between the terminals 14, 16 via the communications link 12 should not vary significantly as there are no factors outside of the distance between the two terminals. Once a modulation is chosen that can be efficiently decoded between the terminals 14, 16, there should not be a need for change and the communications system should operate.

However, in a real environment such as the that shown in FIG. 2, many factors impact the communications link between two terminals 14, 16 including attenuation and absorption by clouds 18, precipitation 20, reflective and absorptive obstacles 22, and other wireless transmissions operating in the medium and noise sources 24. Furthermore, thermal radiation from transmitting and receiving elements of the terminals 14, 16, distortion of amplifiers of the terminals 14, 16, multipath reflections 26 of the carrier, and interactions between separate carriers can all cause various forms of interference which cause errors at the receiving terminal. Although two terminals 14, 16 are shown in the example of FIG. 2, other communications systems may include more than two terminals in communication with one another via respective communications links.

To overcome the above-mentioned problems, terminals 14, 16 may restrict how finely grained the modulation of the carrier signal is, and use some fraction of the data transmitted that is mathematically redundant with other data within the messages so that errors can be detected and corrected. This process of mathematic redundancy in the data is called forward error correction (FEC). The combination of modulation and forward error correction is collectively called a modulation and coding scheme, or modcod.

Data on a network is transmitted in a series of packets of data to be sent somewhere with a header specifying where and potentially how the data should be transmitted. A modem bundles packets received thereby into a plurality of frames. Depending on the framing strategy many packets may be included within a single frame, or the packets may be broken up and communicated via small frames and the packets are reassembled at the remote terminal's data interface. Relatively high bandwidth links generally use large frames while low bandwidth links typically use reassembly.

Referring to FIG. 3, an example data frame 30 is shown where one quarter of the frame 30 is dedicated to error correction and cannot be used for data. As shown in FIG. 3, the frame 30 includes three data packets 32 for user data and one quarter of the frame for FEC data 34. In this system, if up to a quarter of the data packets 32 are unreadable, the FEC data 34 can be used to reverse calculate the correct values and the frame 30 can be correctly delivered. If more than one quarter of the data is unreadable, the frame 30 cannot be decoded.

With the above example coding scheme, three quarters of the total frame 30 was useful data at the remote end, regardless of errors and this FEC coding has an efficiency of 75%. Modulation and coding schemes are generally reported in the format <clock resolution> <keying method> <coding efficiency>, so for example a modulation and coding scheme capable of delivering 3 bits/Hz (and thus with $2^3=8$ divisions of the clock) using phase shift keying and one fifth of the data for FEC would be reported as the modulation and coding scheme 8PSK⅘. This modulation and coding scheme can transmit 3*⅘=2.4 bits/Hz of spectrum allocated to the transmission.

As mentioned above, the theoretical efficiency of the carrier is measured as the number of bits that can be transmitted divided by the spectrum allocated of carrier, or bits/Hz. There is a physical limitation known as the Shannon limit that limits how efficiently data may be decoded at a given energy level within a carrier and that may be determined using the Shannon Hartley Theorem. Many of the environmental effects shown in the arrangement of FIG. 2 attenuate a signal reducing the energy in the carrier signal, while also adding distortion. The best efficiency in a communications link is achieved when a modulation and coding scheme is selected that most closely approaches this boundary for a given carrier as attenuated by its environment.

Modems operate on agreed modulation and coding schemes and framing. For example, many geostationary satellites use the Digital Video Broadcast Second Generation (DVB-S2) and DVB-S2 Extended modulation and coding schemes. To establish a network, a set of equipment operating within a given modulation standard is set to broadcast at some agreed frequency, symbol rate, and modulation. When a receiving terminal receives data of high enough quality that it can decode the frame of data and lock onto the transmitted carrier's center frequency, the terminals are then said to be locked. If something in the channel degrades the connection to the point that this frequency cannot be identified by the receiving modem, the terminals are then said to have lost lock.

At least some aspects of the present disclosure are directed to communications devices, communications systems and associated communications methods as discussed in detail below.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Some aspects of the disclosure described herein are directed to apparatus and methods that select a communications parameter to be used for subsequent data transmissions. In one embodiment, the systems and methods select the communications parameter comprising one of a plurality of different modulation and coding schemes (modcods) for transmitted signals. The selected modulation and coding scheme provides the highest spectral efficiency in one embodiment. As discussed below in some example embodiments, one or more carrier parameters, such as data error rate, signal levels of various measurements and associated timestamps of the data may be utilized to select different modulation and coding schemes that are used during communications at different times.

Each modulation and coding scheme has a specific spectral efficiency which is a combination of how many bits/Hz the data is encoded to and how much data is allocated to FEC to correct misreads. When comparing two modulation and coding schemes, the one with the highest overall spectral efficiency is the higher modulation and coding scheme. If a carrier signal is broadcast by a communications device that operates at a modulation and coding scheme too high for the channel it is in, the remote communications device will not be able to demodulate and decode one or more frames of the signal and these frames are discarded. A frame that is discarded because it does not have sufficient error correction to recover the data is an uncorrectable frame. In one embodiment, the occurrence of an uncorrectable frame in the signal results in the increase of a frame event count.

In one embodiment, optimum modulation and coding schemes are selected for use at different times of the communications. These are the highest or most spectrally efficient modulation and coding schemes that can be used in a specific communications channel without introducing frame errors above an acceptable rate.

A communications device is any endpoint that can send and/or receive a modulated electromagnetic carrier. Some aspects of the disclosure pertaining to selection of communications parameters, such as modulation and coding schemes, may be utilized with different configurations of the communications devices without limitation and including for example, wireless radios, satellites, satellite ground stations, radio base stations, and mobile phones.

Figure 1:
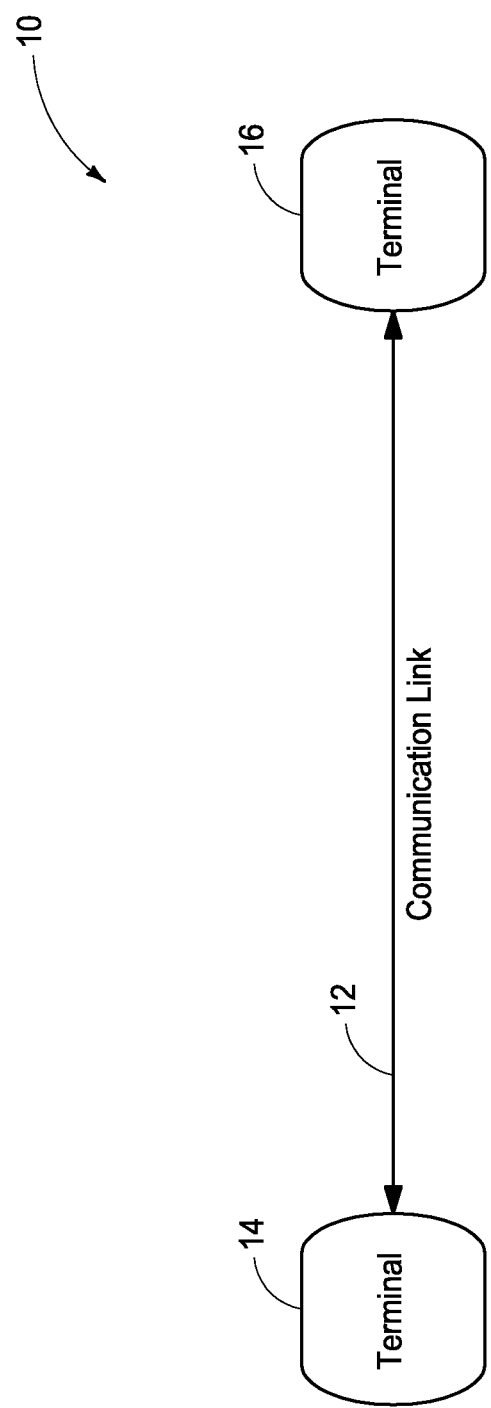
FIG. 1 is an illustrative representation of an ideal communications system.
Figure 2:
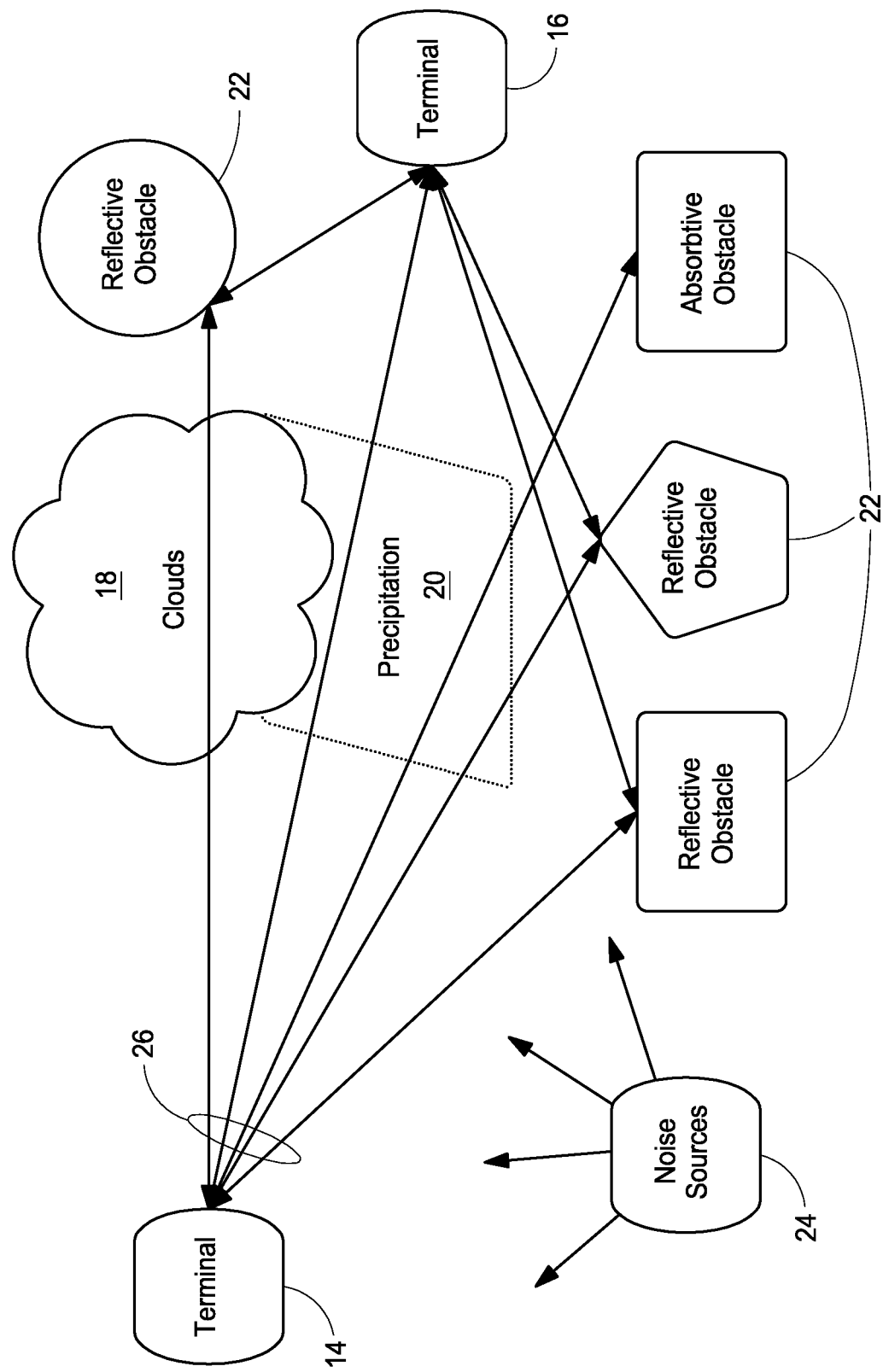
FIG. 2 is an illustrative representation of a communications system in a real environment.
Figure 3:
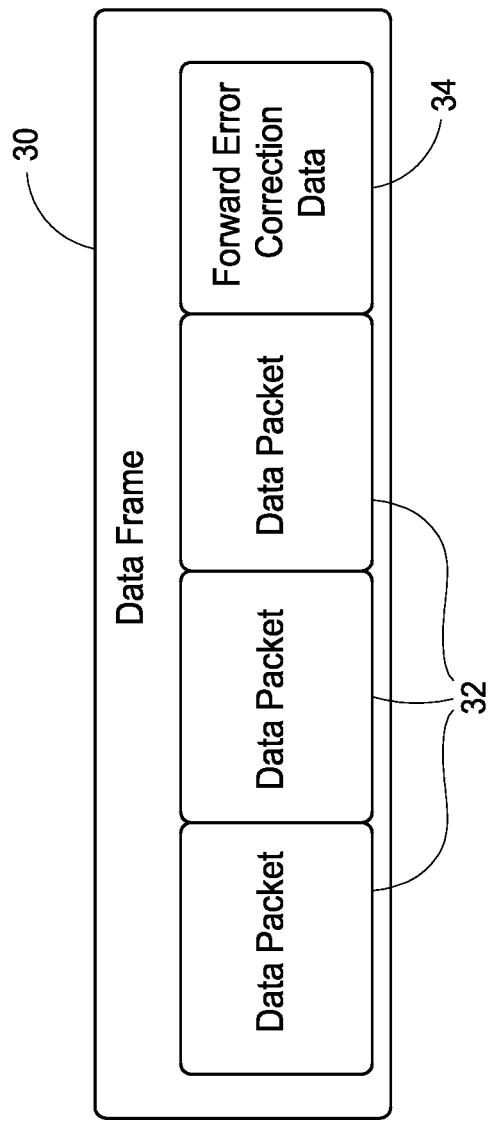
FIG. 3 is an illustrative representation of a data frame according to one embodiment.
Figure 4:
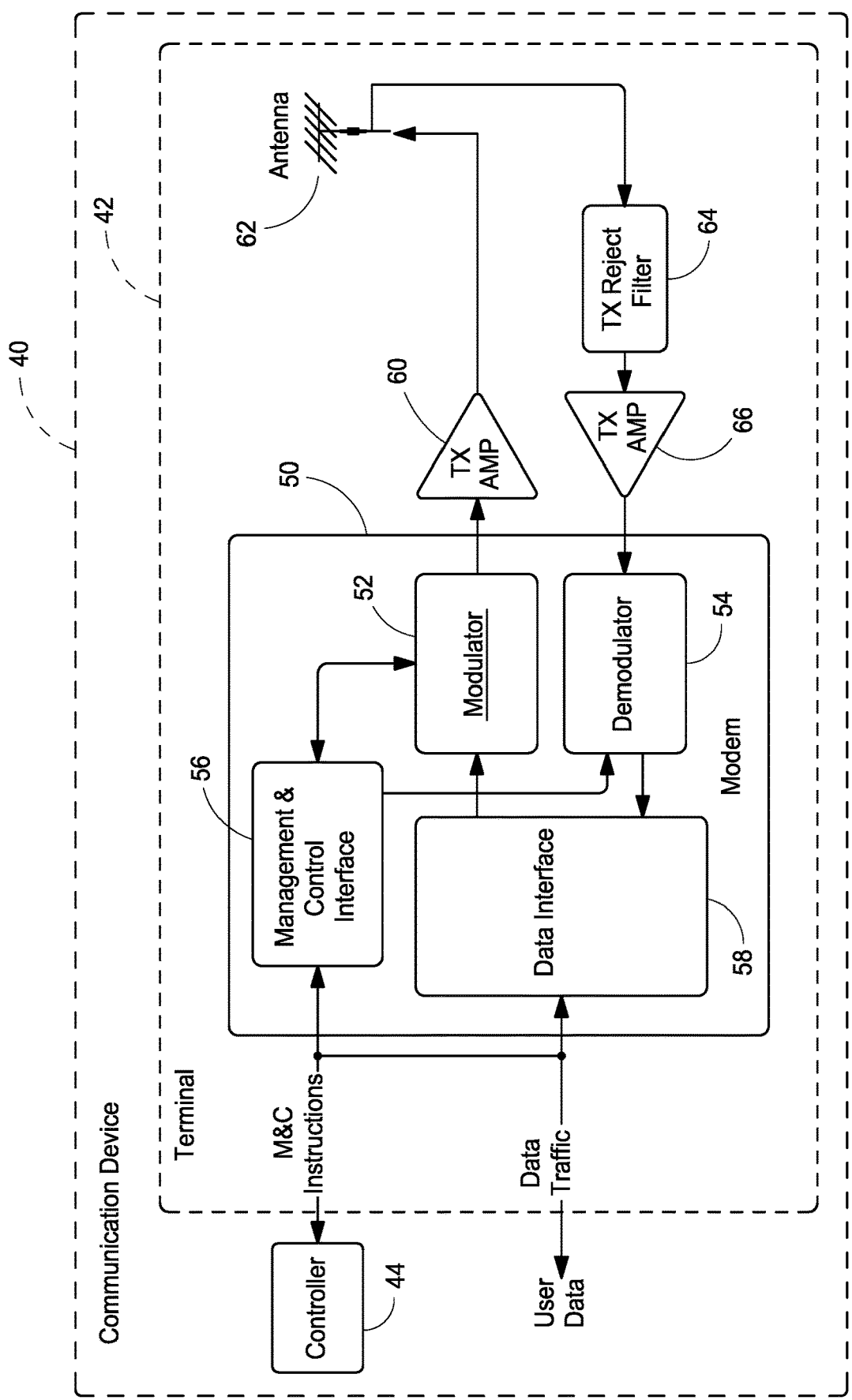
FIG. 4 is a functional block diagram of a communications device according to one embodiment.

Referring to FIG. 4, one embodiment of a communications device 40 is shown. Other implementations of communications device 40 are possible including more, less and/or alternative components than those shown in FIG. 4.

Figure 5:
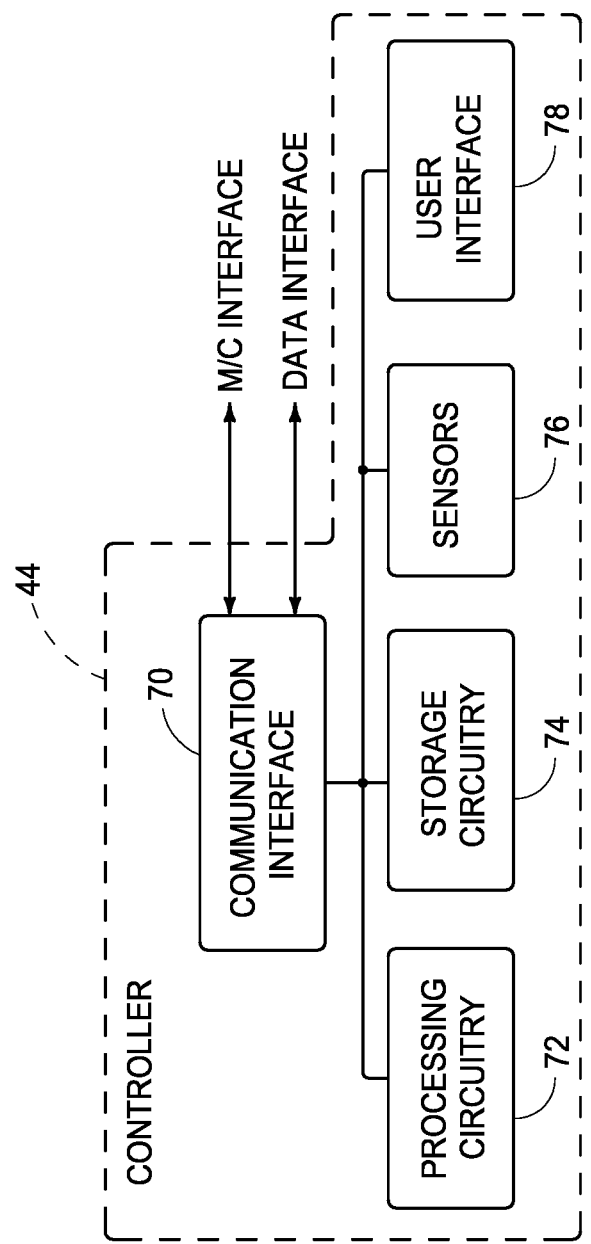
FIG. 5 is a functional block diagram of a controller according to one embodiment.

The illustrated communications device 40 includes a terminal 42 and a controller 44. Terminal 42 includes a modem 50, transmit amplifier 60, antenna, transmit reject filter 64 and receive amplifier 66. The depicted modem 50 includes a modulator 52, demodulator 54, management and control (M/C) interface 56 and data interface 58. Details of one embodiment of controller 44 are shown in FIG. 5.

In the illustrated example, user data or data traffic (e.g., voice, video, textual, etc.) to be transmitted by the communications device 40 is initially received by the data interface 58 and is encoded by modulator 52 into a waveform that is amplified at transmit amplifier 60 that may be a Block up Converter (BUC) or a Traveling Wave Tube Amplifier (TWTA) and applied to antenna 62 for wireless transmission to a remote communications device (not shown in FIG. 4).

Antenna 62 is also coupled with a transmit reject filter 64 that prevents a high-powered local TX signal from overpowering the signal received by antenna 62 that has lower intensity than the transmit signal. The signal collected from the antenna 62 is amplified by receive amplifier 66 that may be a low noise amplifier (LNA) or a Low Noise Block downconverter (LNB) and transmitted to demodulator 54 that demodulates user data from the received signal and passes it to data interface 58 for communication to a proper user destination.

In some configurations, the M/C interface 56 and data interface 58 are physically connected to the same port but are split logically. M/C interface 56 is configured to receive management and control instructions that may change the configuration or operation of the modem 50 in one embodiment. In addition, the M/C interface 56 is configured to control the modulation of the carrier signal in the transmit path, and to report values of one or more carrier parameters regarding a communications link between the local communications device 40 and a remote communications device that define the link's carrier quality. Examples of these carrier parameters include one or more of carrier input power, signal to noise ratio (SNR), carrier distortion, clock offset, frame error counts, bit error counts or rates, frame counts, link margin, cycle slip counters, non-linearity measurements and timestamps associated with the respective values. The carrier parameters and timestamps may be collected into a log over time and used for statistical analysis.

Controller 44 is configured to receive the carrier parameters from M/C interface 56 and to communicate information to the M/C interface 56, such as configuration information that is utilized to control the communications of the device 40. In one embodiment, controller 44 communicates modulation and coding schemes to M/C interface 56 that are used by the modem 50 at different times to modulate a carrier signal of the transmit signal that is outputted from the communications device 40 for communication to a remote communications device.

The controller 44 may monitor signals transmitted and received by the local communications device 40 and provide different modulation and coding schemes to the M/C interface 56 as a result of the monitoring example embodiments discussed in additional detail below. In addition, controller 44 may also monitor the environment of the communications device 40 and use information generated regarding the environment to select appropriate modulation and coding schemes. Additional details regarding monitoring by controller 44 and selection of modulation and coding schemes by controller 44 are discussed in further detail below.

Referring to FIG. 5, one embodiment of a controller 44 is shown. The depicted controller 44 includes a communications interface 70, processing circuitry 72, storage circuitry 74, one or more sensors 76 and a user interface 78. Other embodiments of controller 44 are possible including more, less and/or alternative components.

Communications interface 70 is configured to implement bi-directional communications with respect to the M/C interface 56 and data interface 58 of the local modem 50 with which the controller 44 is associated.

In one embodiment, processing circuitry 14 is arranged to process data, control data access and storage, issue commands, and control operations of controller 44, the associated local modem 50 and/or one or more remote modems (the remote modems are not shown in FIG. 5). Processing circuitry 72 is configured to monitor carrier parameters and/or environmental parameters and to control one or more communications parameters of the communications system in one embodiment.

Processing circuitry 72 includes circuitry configured to implement desired programming provided by appropriate computer-readable storage media in at least one embodiment. For example, the processing circuitry 72 may be implemented as one or more processor(s) and/or other structure configured to execute executable instructions including, for example, software and/or firmware instructions. Other example embodiments of processing circuitry 72 include hardware logic, PGA, FPGA, ASIC, state machines, and/or other structures alone or in combination with one or more processor(s). These examples of processing circuitry 72 are for illustration and other configurations are possible.

Storage circuitry 74 is configured to store programming such as executable code or instructions (e.g., software and/or firmware), electronic data, databases, look-up tables, logs, or other digital information and may include computer-readable storage media. At least some embodiments or aspects described herein may be implemented using programming stored within one or more computer-readable storage medium of storage circuitry 74 and configured to control appropriate processing circuitry 72. Storage circuitry 74 may be implemented using RAM memory in one embodiment.

Sensors 76 are configured to monitor one or more environmental parameters regarding an environment of the communications device and to output data or values regarding the monitored environmental parameters and associated timestamps for the values. Example environmental parameters that may be monitored include temperature, wind speed, wind direction, antenna angle, and velocity of the communications device.

User interface 78 is configured to receive user inputs from a user, such as a keyboard and mouse inputs, and to generate images regarding operations of the controller 44 and associated local communications device (e.g., modulation and coding schemes being utilized, frame error counts, link outages, etc.).

From the vantage point of any given communications device in a communications system, there is a local communications device, and one or more remote communications device(s) which are collecting and sharing data. According to one embodiment, during communications with the remote device(s) in the communications system, a given local communications device monitors and collects values for one or more local carrier parameters, one or more communications parameters, and the associated timestamps and shares them with the other remote communications device(s). The local communications device may further log values of incoming carrier parameters, communications parameters and timestamps from the remote communication(s).

In one embodiment, it is desired to select and utilize the highest transmit modulation and coding scheme from a transmitting communications device that can reliably be received by a target remote communications device. An analytical selection process is discussed below that may be utilized in one embodiment to select modulation and coding schemes during operations of the communications system.

In one embodiment, each modem 50 is monitored by a local controller 44 that periodically communicates values for one or more carrier parameters monitored at the local terminal (e.g., the local modem's received signal to noise ratio (SNR) and most recent frame error count) and timestamps to the controller(s) 44 associated with the remote communications device(s) for use by the remote devices(s) to select modulation and coding schemes for communications from the respective remote device(s) to the local device.

In some embodiments, the local and remote communications devices of the communications system may be configured according to a common transmission plan or communications standard that specifies a compatible set of modulation and coding schemes as well as a prearranged frequency and carrier bandwidth (although the devices may be configured for dynamic selection of carrier frequencies and bandwidths in some implementations). A demodulator of a given receiving communications device detects received carrier signals of sufficient SNR, locks on to the carrier signals and decodes the data stream.

Figure 6:
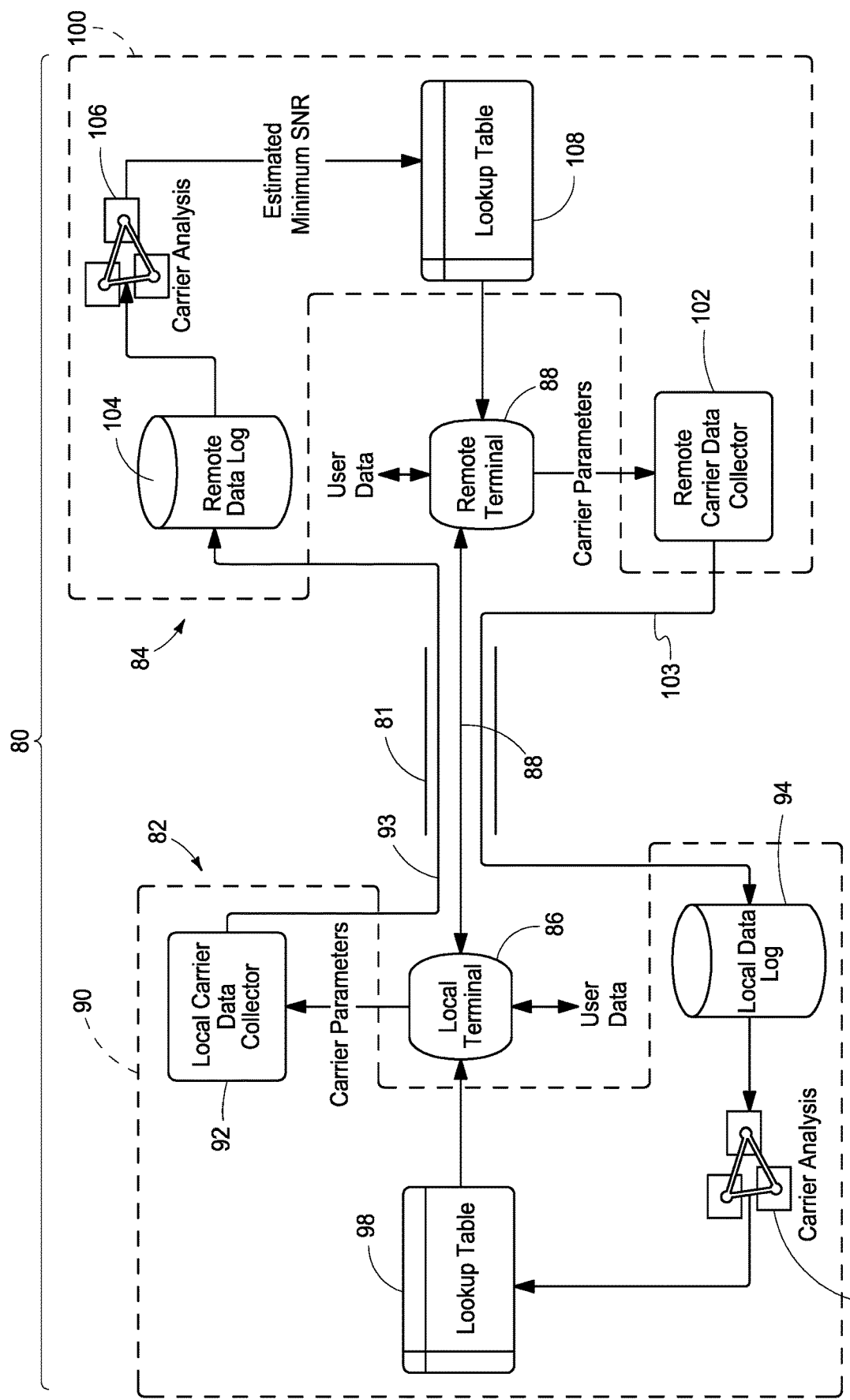
FIG. 6 is a functional block diagram of a communications system according to one embodiment.

Referring to FIG. 6, one embodiment of a communications system 80 is shown that utilizes an analytical process to select or control a communications parameter, such as modulation and coding schemes, to be used for communications. The illustrated communications system 80 includes two communications devices 82, 84 although additional communications devices 82, 84 may be communicating within system 80 in other embodiments. The devices 82, 84 communicate via a communications link 81 and each device 82, 84 may be configured similarly to the arrangement of the communication device 40 described above with respect to FIG. 4 in one embodiment. Communications link 81 may have different configurations in different embodiments, such as a wireless link or an optical link in example embodiments.

Communications device 82 may be referred to as a local device and includes a local terminal 86 and associated controller 90 and communications device 84 may be referred to as a remote device and includes a remote terminal 88 and associated controller 100.

In the illustrated embodiment, controller 90 includes a local carrier data collector 92, local data log 94, carrier analysis program 96, and lookup table 98 and controller 100 includes a remote carrier data collector 102, remote data log 104, carrier analysis program 106, and lookup table 108.

The controllers 90, 100 may be configured as shown in FIG. 5 in one embodiment. The carrier data collectors 92, 102 and carrier analysis programs 96, 106 may be implemented using processing circuitry 72 and the data logs 94, 104 and lookup tables 908, 108 may be implemented using storage circuitry 74 in one embodiment. Each communications device 82, 84 of the communications system 80 may select its own modulation and coding scheme for transmissions, and accordingly different communications device in a communications system may simultaneously use different modulation and coding schemes for respective communications.

An initialization procedure of the communications devices 82, 84 is performed to initiate communications therebetween as discussed in one example below. In one embodiment, at start-up, the lowest modulation and coding scheme is selected by each of the controllers 90, 100 to ensure receipt of communications at the other end. Once the terminals 86, 88 have locked onto one another's carrier signal, the lowest modulation and coding schemes are used by the respective terminals 86, 88 to transmit user data 88 via communications link 81 and the carrier data collectors 92, 102 record the values of the carrier parameters and timestamps monitored at the respective terminals 86, 88 and transmit 93, 103 them over communications link 81 to the data log 94, 104 of the other terminals 86, 88.

Once the values of the carrier parameters from the devices 82, 84 have been collected into a statistically significant set, each of the carrier analysis programs 96, 106 process the carrier parameter values to determine estimated safe SNRs that are communicated to respective lookup tables 98, 108. Additional details regarding the processing of the carrier parameter values to determine the respective minimum SNRs are discussed below with respect to Equation 1.

The lookup tables 98, 108 each receive the respective minimum SNRs outputted from programs 96, 106 and identify corresponding modulation and coding schemes (e.g., providing the highest spectral efficiency) to use and each of the terminals 86, 88 uses its respective modulation and coding scheme to transmit user data 88 via communications link 81. After initialization, the terminals 86, 88 independently select their respective transmit modulation and coding schemes based on the processing of the respective carrier analysis programs 96, 106.

Physics dictates the theoretical maximum data throughput of a carrier signal and which may be obtained by the Shannon Hartley Theorem. The practical limited modulation and coding scheme, is a combination of carrier energy, distortion in the signal, physical transmission limited by external environmental inputs and power of the radio. The Shannon Hartley Theorem is used in one embodiment to determine different modulation and coding schemes that may be used to achieve respective required SNRs for communications between the devices of a given communications system and examples of SNRs and associated modulation and coding schemes and efficiencies are shown in Table A.

TABLE A

| SNR Required (dB) | Modcod | Efficiency (b/hz) |
|---|---|---|
| ... | ... | ... |
| 11.88 | 16apsk56 | 3.33 |
| 13.08 | 32apsk34 | 3.75 |
| 13.8 | 32apsk45 | 4 |
| 14.1 | 32apsk5/6 | 4.17 |
| ... | ... | ... |

Example carrier parameters that may be monitored and processed to determine an appropriate modulation and coding scheme for a given communications device according to one embodiment include current Signal to Noise Ratio (SNR) at the remote device, Standard Deviation in SNR over a sampling period at the remote device, frame error rates over a sampling period at the remote device, and link failures within a sampling period. In addition, operator defined scaling factors may also be used to determine modulation and coding schemes as discussed below.

To verify bidirectional communications, a call and response is used in one embodiment where each receiving device sends back an acknowledgement packet (ACK) for every data packet received with a timestamp to verify two-way communication. If the link in one direction fails, no new ACKs will be transmitted nor received. When the carrier analysis program of a device detects that ACKs are not being received, it can reasonably assume that communication has been lost between the terminals (i.e., a link failure has occurred) and sends alarm packets to the remote terminal to request a reduction in modulation and coding scheme. After a delay, the controller of the communications device that detected the outage reduces its transmit modulation in the assumption that the remote device has lost lock. Once restored as determined by receipt of new ACKs, the carrier analysis program of the communications device that detected the outage thereafter increases modulation and coding scheme until it restores optimal link operation at the highest modulation and coding scheme while also logging a link outage.

Communications via the link vary over time due to stochastic environmental processes. By monitoring carrier parameters and calculating standard deviation using carrier statistics from the remote device, the carrier analysis program of the local device adapts its minimum SNR modulation to optimize the link as discussed further below. If uncorrectable frames are reported at or near theoretical limits, then decreased signal quality, transient environmental effects, or other problems are the cause, and the controller may reduce the modulation and coding scheme used for transmissions to accommodate the reduced link quality.

In one embodiment, the remote terminal keeps track of the last 20 seconds of received SNR data and calculates the standard deviation of samples over that period. If the frame error count increases by more than a threshold of frame errors between reads, an event is logged as a frame error and is tracked as a frame error rate (error events/time). If the system stops receiving packets for more than a few seconds, the control system logs the event as a link failure and reduces modulation and coding scheme until packet flow is restored as described above. A link failure counter keeps track of every time packet flow is disrupted over the past several hours (outages/time).

In one embodiment, one or more of four carrier parameters: (1) most recent remote SNR, (2) standard deviation of remote SNR samples, (3) frame error rate, and (4) link failures (outage rate) may be used by the carrier analysis program of the local communications device along with scaling factors to determine the modulation and coding scheme to be used to transmit data. In one more specific embodiment, the processing circuitry of the controller is configured to use Equation 1 to determine a Safe SNR that may be used to determine an appropriate modulation and encoding scheme.

$$\text{SafeSNR(db)}=\text{Current SNR}-(\text{StDev}*\text{SF1})-(\text{FE}*\text{SF2})-(O*\text{SF3})-\text{BSF} \quad \text{(Eqn. 1)}$$

where
BSF=Base Safety Factor
StDev=Standard deviation of the past SNR 20 measurements
FE=Frame Error Events/Count for the past 20 minutes
O=Link Outages in the past 4 hours
SF1=SNR Standard Deviation Scaling Factor
SF2=Frame Error Rate Scaling Factor
SF3=Scaling Factor associated with total link failures in the last 4 hours.

Eqn. 1 above is one example equation that may be used to select a modulation and coding scheme and other equations may be used for modulation and coding scheme selection including equations that omit one or more of the parameters or variables of Equation 1 or include one or more additional parameters or variables.

In one embodiment, the base safety factor (BSF) is a static offset, and plural scaling factors (SF1, SF2, SF3) may be determined administratively and that are intended to establish the sensitivity of the control system to various factors that are used in calculating a safe modulation and coding scheme. Different values of the factors may be selected and used in Equation 1 for different implementations, designs or configurations of the communications systems.

In general, the use of standard deviation is an indicator that abnormalities may have begun occurring in the communications link. If conditions cause large SNR variation, the standard deviation increases to hold down the modulation and coding scheme to maintain a reliable communications link. For a device utilizing a relatively large dish antenna in a given communications system, increased variations of SNR may be expected due to wind or other environmental effects and the factor SF1 for standard deviation may be a smaller value compared with an arrangement where smaller dish antenna is utilized.

Initially, the calculated safe SNR (i.e., the SNR where an acceptable number of frame errors are expected) is determined by subtracting the BSF and FS1 times the standard deviation of the samples from the recorded current SNR received from the remote communications device. If the BSF and FS1 are set too small to prevent errors in transmission, uncorrectable frames will occur at the remote device. When carrier noise is present due to interference from other terminals or otherwise, frame error events are detected and cause the controller to reduce the modulation and coding scheme to compensate for the presence of the frame errors. Accordingly, an additional safety margin may be calculated by the rate of uncorrectable frames times FS2 that is subtracted to calculate the safe SNR if frame errors are present. In one specific example, every time a frame error event occurs, the operator may wish the link to back off the calculation by 0.05 dB, therefore SF2 would be equal to 0.05. Thus, if 30 frame errors occurred in the sampling period, the analysis program would reduce the calculated minimum SNR by 30 times this scale factor, or 1.5 db.

In a worst case, when the above strategies do not avoid full failure or outage of the communications link, additional factor FS3 may be used in conjunction with the number of link failures to add an additional margin of safety until whatever condition is causing the link failures abates. The third factor SF3 may be larger than factors SF1 and SF2 to reduce the modulation and coding scheme an increased amount in an attempt to restore communications following the occurrence of a full link failure or outage. In one embodiment, the BSF is set to 0.25, FS1 is 0.5, FS2 is 0.01, and FS3 is 2.

In one embodiment, Equation 1 outputs a safe SNR (dB) value that is used to address the lookup table of Table A that provides a modulation and coding scheme that corresponds to the calculated safe SNR to be used for subsequent transmissions from the local transmitting communications device. In one embodiment, the highest modulation and coding scheme is selected that has an associated required SNR that is below the calculated safe SNR. For example, the 32apsk34 modcod may be selected if the calculated safe SNR is 13.5 at a given moment in time since it has the highest spectral efficiency and a required SNR below the calculated safe SNR. This selected modulation and coding scheme may be used until the processing of the carrier parameters resulting from subsequent transmissions using Equation 1 and Table A indicate that a new modulation and coding scheme should be used.

The use of the different variables (parameters) and scaling factors in Equation 1 provide a plurality of possible different adjustments to the signal to noise ratio measured at the remote device. Processing circuitry selects one of the adjustments (e.g., reductions of SNR) using the standard deviation of SNR at the remote device, frame errors at the remote device, and link outages in the described embodiment and the selected adjustment is subtracted from the measured signal to noise ratio at the remote device to calculate the safe SNR that is used to address the lookup table of Table A and select the modulation and coding scheme for subsequent transmissions as discussed above.

Figure 7:
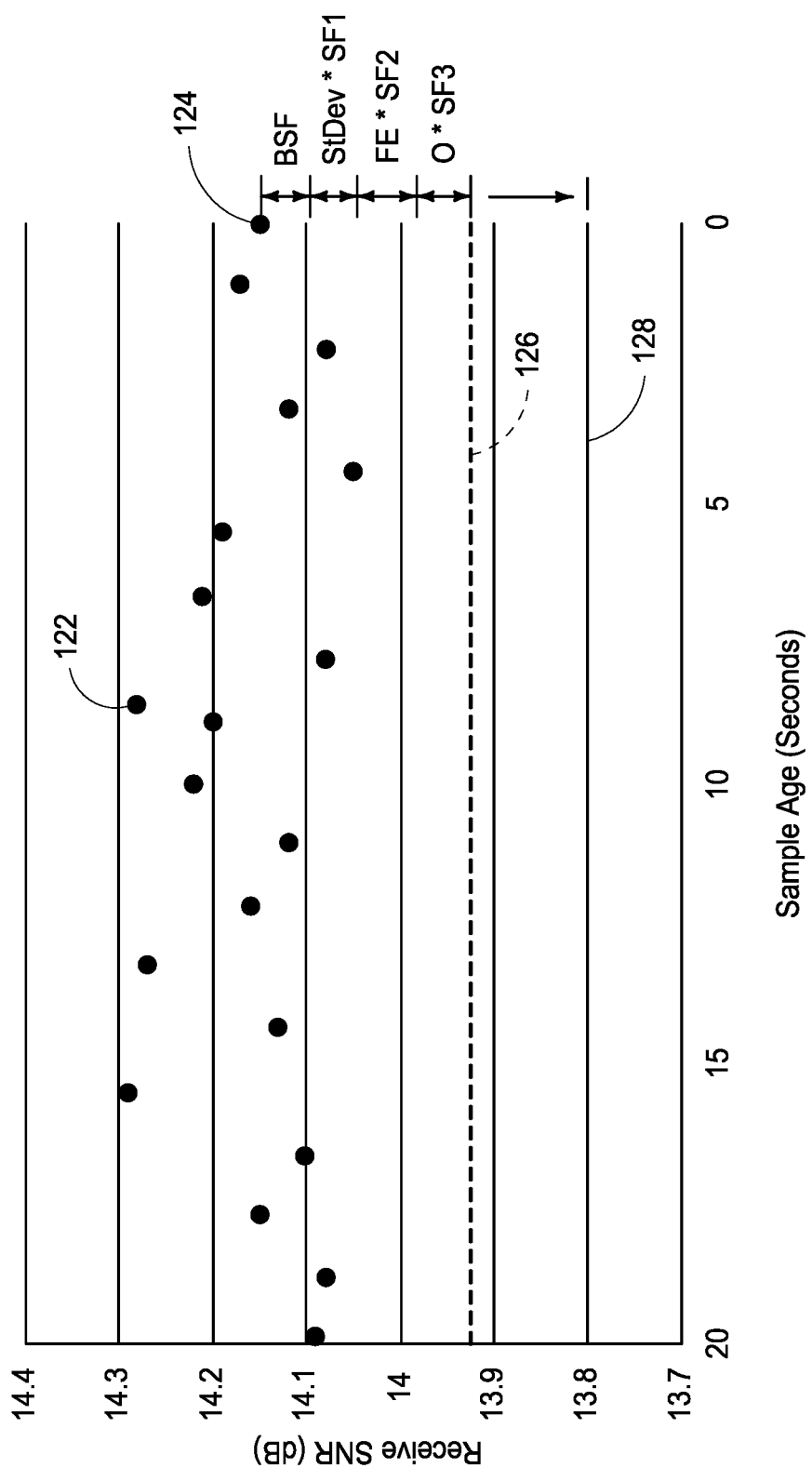
FIG. 7 is a graphical representation of calculation of a safe signal to noise ratio according to one embodiment.

Referring to FIG. 7, an example determination of the SNR for addressing Table A is shown. A plurality of previous data samples (i.e., SNR measurements 122 from the remote terminal prior to time t=0) are used to determine an appropriate modulation and coding scheme for future transmissions from the local device at time t=0. At time t=0, the most recent SNR measurement 124 from the remote terminal is used in Equation 1 along with the BSF, Standard Deviation× SF1, frame errors×SF2 and link outages or failures×SF3 to determine a safe SNR 126. The modcod 32apsk45 is selected as the modulation and coding scheme having an associated required SNR of 13.8 shown as reference 128 and that is below the calculated safe SNR of 13.92 and has the greatest spectral efficiency.

Figure 8:
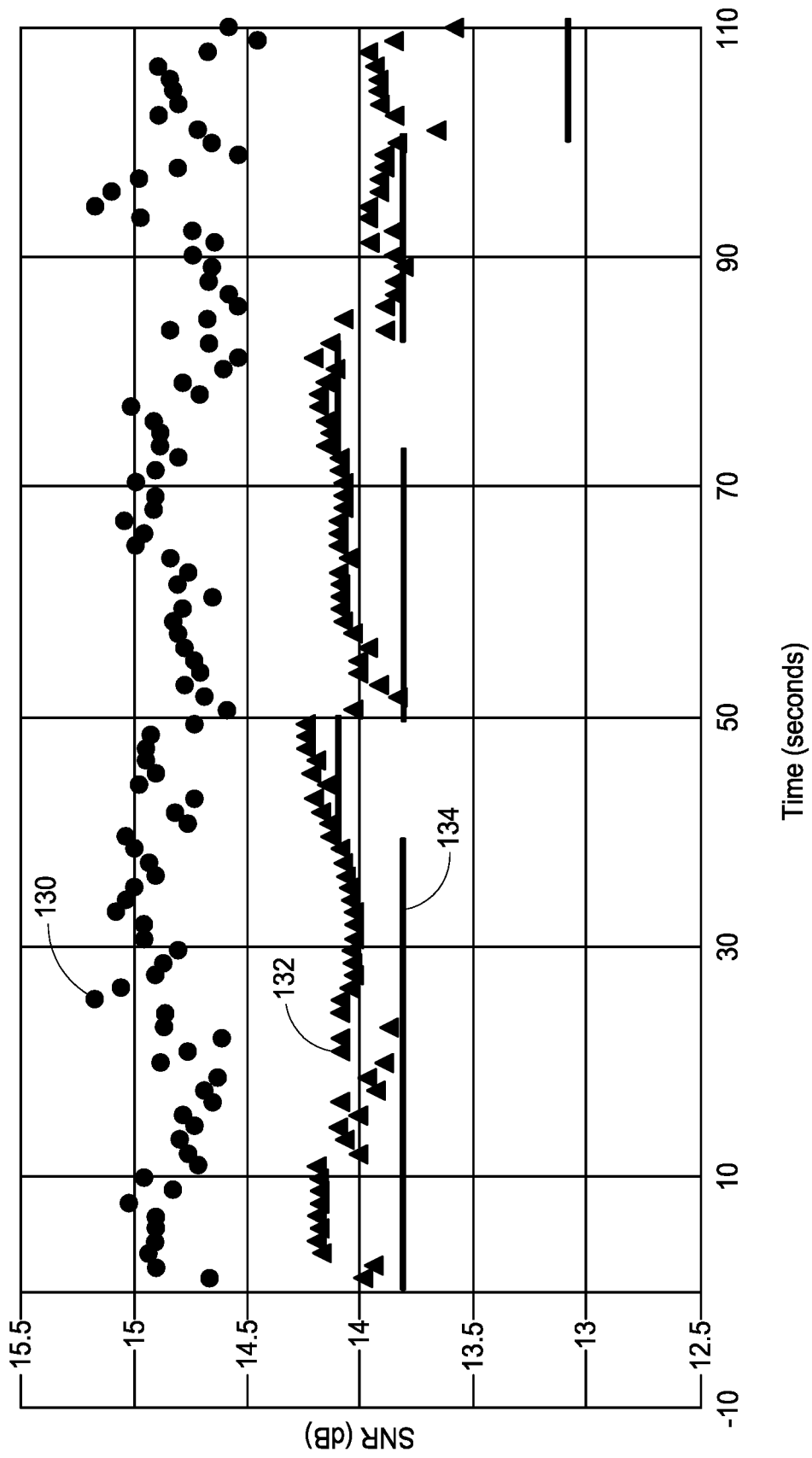
FIG. 8 is a graphical representation of selection of different modcods responsive to different input data.

The resulting performance of an example terminal using Equation 1 and Table A over a time period of 110 seconds is shown in FIG. 8. The calculated minimum SNR 132 is lower (by on average 0.7 db) than the SNR reading 130 at every measurement in the dataset indicating adequately conservative parameters. Note that the signal received at the remote device begins varying erratically between 90 and 110 seconds and the controller of the local (i.e., transmitting terminal) generates more conservative estimates as the standard deviation of the samples increases in the illustrated example.

The use of Equation 1 in the above-described analytical modcod selection by the controller is one example embodiment for determining the modulation and coding schemes to be used during communications. According to other embodiments described below, the controller utilizes a Machine Learning (ML) network to select the modulation and coding schemes of a communications link. Use of a Machine Learning (ML) network enables the communications system to be proactive rather than reactive to changes occurring during communications. The analytical modulation and coding scheme selection system described earlier responds based on the statistics collected after the measurements have occurred. An ML network modulation and coding scheme selection system trained on a sufficiently large training dataset is configured to make intelligent proactive adjustments to the modulation and coding scheme being utilized by recognizing trends in signal quality, variations in environmental conditions and/or or other factors.

Figure 9:
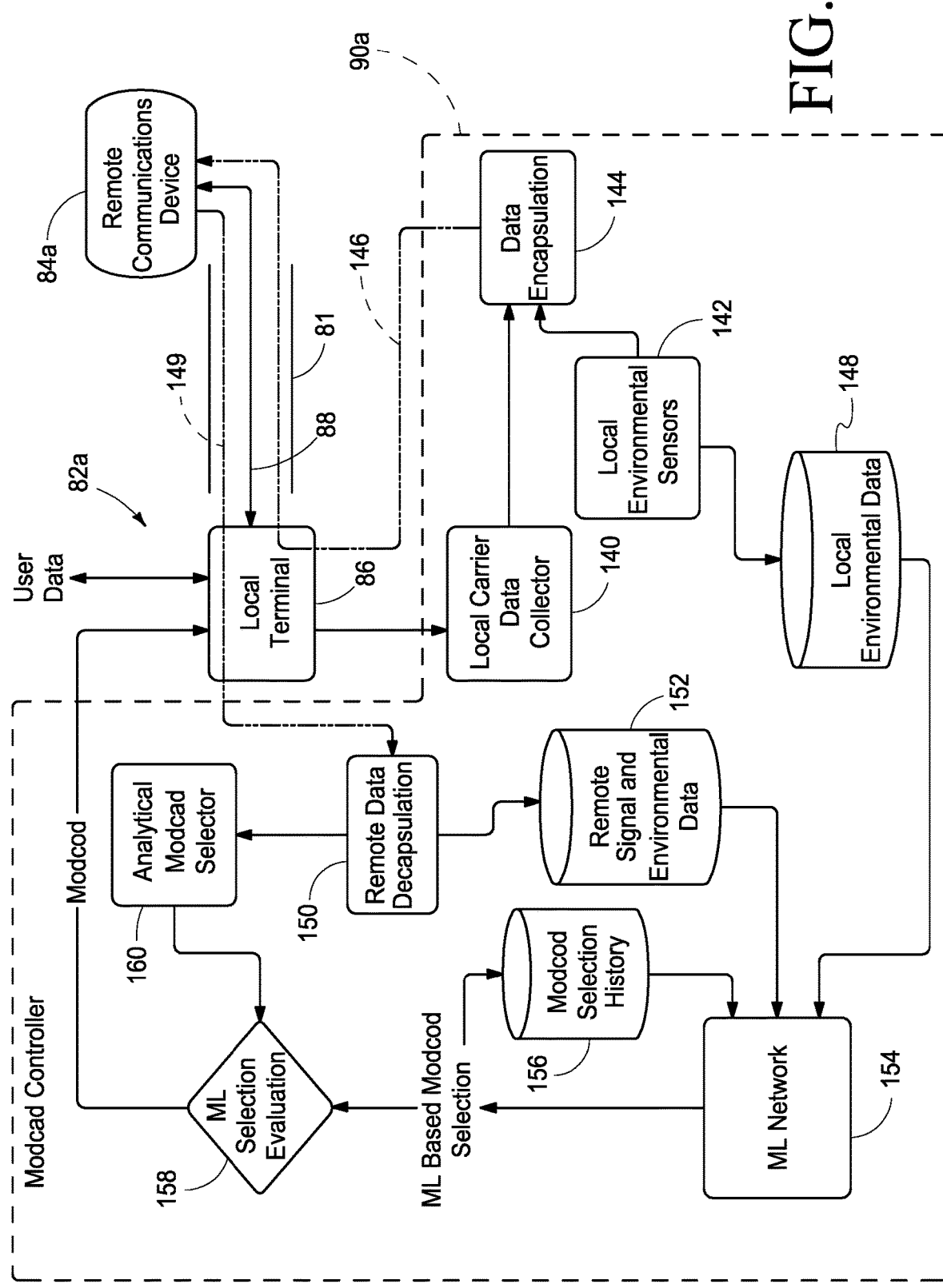
FIG. 9 is a functional block diagram of a communications system according to one embodiment.

One example controller that utilizes an ML network to select modulation and coding schemes is shown in FIG. 9 and includes some similarities to the communications system shown in FIG. 6. FIG. 9 depicts the details of only one communications device 82a (that may be referred to as a local device for discussion purposes) of the communications system although it is understood that the depicted communications device 82a communicates with one or more remote communications device 84a. The remote communications device(s) 84a of the communication system may include the same components and processes of the local communications device 82a that is shown in FIG. 9.

In the illustrated embodiment, controller 90a includes a carrier data collector process 140, environmental sensors 142, data encapsulation process 144, environmental data storage 148, remote data decapsulation process 150, remote signal and environmental data storage 152, ML network 154, modulation and coding scheme selection history 156, ML selection evaluation process 158, and analytical modulation and coding scheme selector process 160.

The controller 90a may be configured as shown in FIG. 5 in one embodiment. The carrier data collector process 140, data encapsulation process 144, remote data decapsulation process 150, ML network 154, ML selection evaluation process 158, and analytical modulation and coding scheme selector process 160 may be implemented using processing circuitry 72 and the environmental data storage 148, remote signal and environmental data storage 150 and modulation and coding scheme selection history 156 may be implemented using storage circuitry 74 in one embodiment.

Local carrier data collector 140 interrogates the local terminal 86 over the terminal's M/C interface to collect carrier parameter values and associated timestamps received 88 from the remote communications device 84a via the communications link 81. Concurrently, one or more environmental sensors 142 of local device 82a generates and records values of one or more environmental parameters, such as wind speed and direction, precipitation, location, antenna angle, phased array conditions, and velocity of the communications device 82a along with associated timestamps.

The values and timestamps of the local carrier parameters used for transmission from the local device 82a and values and timestamps of the environmental parameters are sent to the data encapsulation process 144 that packs the data into packets to send 146 to the remote communications device 84a periodically, such as once per round trip time for long distance links 81 or once per second for shorter links. Sub-second transmission is appropriate for low latency high bandwidth links, such as wireless backhauls and mobile terminals that may experience rapid changes in signal conditions. The values of these environmental parameters are also fed to a local environmental database 148 for use in the local ML network 154.

The corresponding set of data collection processes of the remote device 84a send 149 the remote device's carrier parameter values, environmental parameter values and timestamps thereof via packets to remote data decapsulation process 150 at the local device 82a where the carrier and environmental parameter values and timestamps sent by the remote terminal are unpacked and logged into remote signal and environmental data storage 152. The values of the carrier signal parameters from the remote terminal are simultaneously sent to analytical modulation and coding scheme selector process 160 which may be the same as that disclosed above with respect to FIG. 6 or an entirely different process for selecting a modulation and coding scheme independent of the ML network 154. The process 160 outputs the selected modulation and coding scheme to ML selection evaluation process 158.

The environmental and carrier signal values from both ends of the communications link are sent to the ML network 154 to determine the modulation and coding scheme that will yield the highest spectral efficiency. The ML network 154 selects one of a plurality of different modulation and coding schemes which is logged in modulation and coding scheme selection history database 156 and sent to the ML selection evaluation process 158 which selects whether to use the modulation and coding scheme provided by the ML network 154 or the modulation and coding scheme provided by the analytical modulation and coding scheme selector process 160.

At a high level, an ML network 154 includes a series of arrays which are conceptualized as neural nodes, that are linked by a pair of coefficients (a weight and a bias) that are initially set randomly or using a seed value. The value of each node in the network is calculated as the sum of the all the nodes before it times the set of weights and biases. The end set of nodes are called the output nodes and correspond to selectable values.

When inputs are fed into the network, the weights and biases that seeded the network will create a result that is incorrect, but by calculating the difference between a desired result and the given result, the weights and biases are slightly corrected to produce a more correct result on the next set. By training ML network 154 against large volumes of data, the network 154 is slowly trained to produce a desired correct result from a set of input data.

Figure 10:
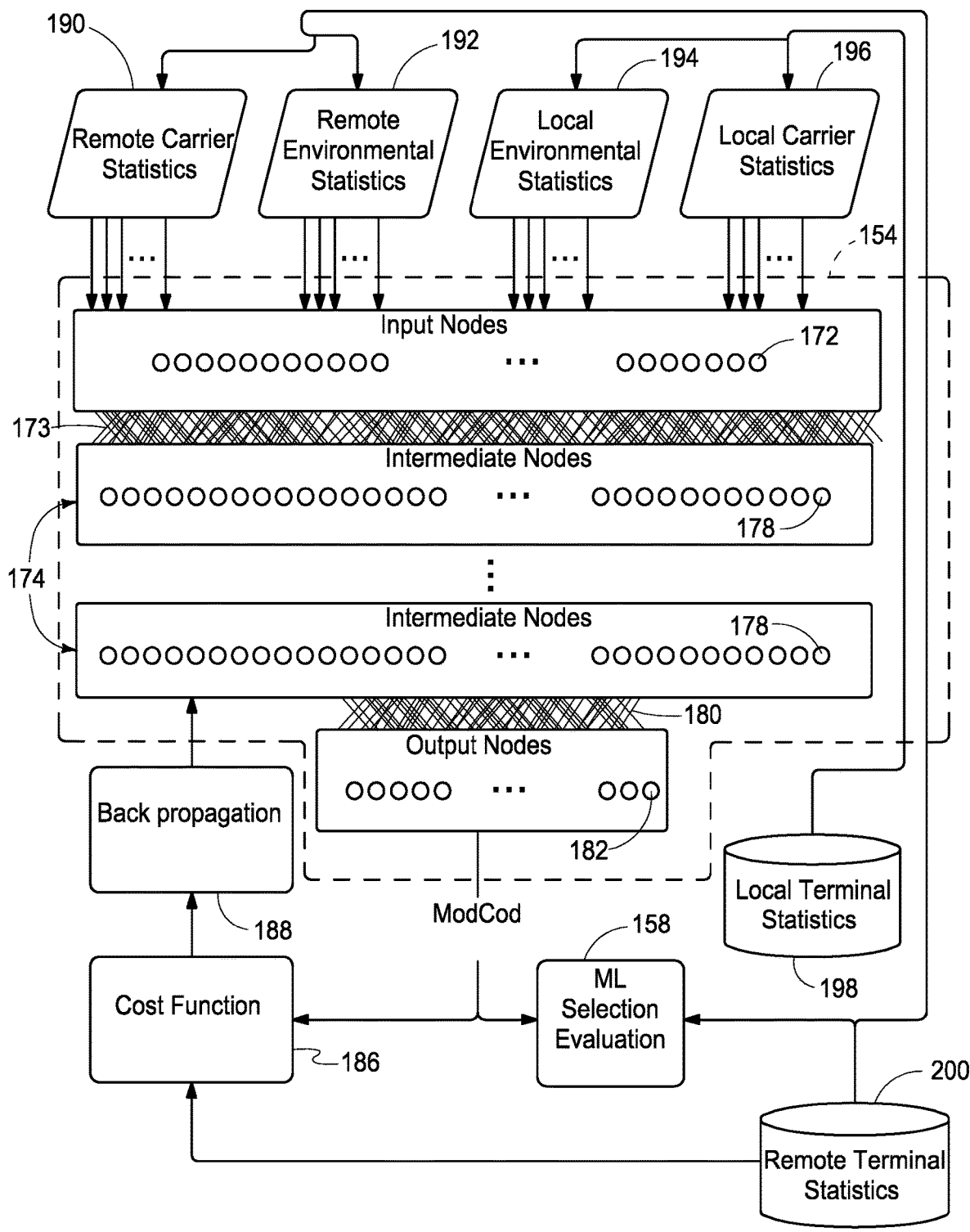
FIG. 10 is an illustrative representation of a machine learning network and associated connections according to one embodiment.

Referring to FIG. 10, an example of an machine learning (ML) based modulation and coding scheme selection network 154 and dataflow therein are described according to one embodiment. The illustrated ML network 154 includes input nodes 172, weights and biases 173, one or more layers 174 of intermediate nodes 178, weights and biases 180 and output nodes 182.

A set of recent statistics from the local and remote communications devices 82a, 84a are sent to input nodes 172 of ML network 154. In particular, remote terminal statistics 200 including values for remote carrier parameters 190 and values for remote environmental parameters 192 and local terminal statistics 198 including values of local environmental parameters 194 and values for local carrier parameters 196 are sent to respective input nodes 172 of the ML network 154.

In one illustrative example, the recent statistics include 500 measurements of wind velocity (speed and direction) measured at the local and remote communications devices for the past 30 seconds and 500 measurements of carrier parameters measured at the local and remote communications device over the same time period. These 1000 measurements are applied to 1000 respective input nodes 172 in this example. The numerical value received via each input node 172 is multiplied by a weight and has a bias 173 subtracted to produce an intermediate value at a respective intermediate node 178 (also referred to as a hidden node or computational node). The number of layers 174 of intermediate nodes 178 may vary depending upon the ML network 154. The intermediate nodes 178 are similar to the input nodes 172 but there are typically many more of them. The values of the intermediate nodes 178 are calculated by the weights and biases 173 of the network 154 and lower layers of the intermediate nodes 178 rather than by a sensor.

Initially, the untrained network 154 is filled with random results. This process, of multiplying values by weights and biases can occur once, or many times for deeply layered networks. The output of the network 154 is a final set of assigned values at output nodes 182 and each of the output nodes 182 corresponds to one of a plurality of different modulation and coding schemes in one embodiment. In another embodiment, the network 154 may be trained to output a safe SNR to address Table A similar to the above-described analytical modcod selection process. Typically, one of the output nodes 182 will have a value much larger than the remaining output nodes 182 and that is selected as the output of the network 154.

The ML network is initialized and trained according to some embodiments of the disclosure. According to one embodiment, the set of values of the environmental and carrier quality parameters are selected to initialize the ML network 154 and parameters of the ML network 154 (e.g., number of input, intermediate and output nodes) and depth (e.g., number of intermediate nodal layers 174) are determined.

The computational resources available and number and type of sensors may be used to determine some of the parameters of the ML network 154. For example, a fixed satellite network may record wind speeds, precipitation, antenna direction and signal level and have considerable resources to build a large complex ML network, while a mobile terminal may monitor location, orientation, speed and signal level and rely on a smaller ML network. The network is initialized with random weights and biases 173, 180 or seed values and thereafter trained as discussed below.

A dataset of training data is used to train ML network 154 in one embodiment. Training data is a collection of values for the local and remote carrier and environmental parameters 190, 192, 194, 196 and a corresponding correct output value (e.g., a modulation and coding scheme that should have been selected). When ML network 154 is initialized and untrained, it generates random results to any given input. During training, each item in the training dataset is fed to the input nodes 172 of the network 154, and the expected output is compared to the actual output of the output nodes 182 of the ML network 154.

A cost function 186 computes differences between the expected outputs and the outputs that were generated by the ML network 154 and through backpropagation 188 new weights and biases 173, 180 are computed that will reduce the cost or difference between the result from the ML network 154 and the expected target result. Each successive set of training inputs and expected output optimizes or trains the network to generate a more accurate result (with a reduced difference from the expected result). Eventually, generally after tens or hundreds of thousands of training cycles, the ML network 154 can reliably produce an accurate result from an input. Once the output of the cost function is sufficiently small (e.g., once the frequency of miss-selection of modcods is acceptably low) the ML network 154 is considered trained and can be used in the embodiment shown in FIG. 9.

Processing circuitry of the local communications device 82a implements ML network 154 and processes 140, 144, 150, 158, 160 of FIG. 9 and storage circuitry of the local and remote devices 82a, 84a store respective local and remote terminal statistics 198, 200 of FIG. 10 and storage of data of databases 148, 152, 156 in one embodiment. Example publicly available machine learning tools that may be used as suitable ML networks 154 to select modulation and coding schemes include Google's Tensorflow, Facebook's PyTorch, SciKit Neural Network, and others. Following initialization of the ML network 154 including setting initial values of the weights and biases 173, 180, training of the ML network 154 is implemented as discussed below according to one embodiment.

Obtaining training data for machine learning may be very laborious, especially where manual classification is utilized. According to some embodiments discussed herein, training data for the modulation and coding scheme selection system is generated in a live environment automatically without user input eliminating this labor. The training data for the ML network 154 is generated using a two-step process described below in accordance with one embodiment.

During step one of training of ML network 154, a more conservative modulation and coding scheme control system (such as the analytical system 160 described above with respect to FIG. 6) is used to select the modulation and coding scheme of the communications link. Values of the environmental and carrier statistics are collected from both ends of the communications link and saved in timestamped carrier statistics databases 198, 200.

To generate the training dataset, the input values for the transmitting device at a given time are associated with the resulting SNR at the receiving device that is forward in time a sufficient amount (e.g., 600 ms after transmission) to reflect the time of flight of the carrier signal from the transmitting terminal to the receiving terminal. This SNR is used to look up a correct modulation and coding scheme, for example using Table A for the transmitting terminal.

The training dataset includes the values of environmental and carrier parameters of the transmitting device and respective resulting carrier parameters and environmental parameters at the receiving device for many different moments in time. The input data including values of the environmental and carrier statistics and respective resulting SNRs at the receiving device (and corresponding modulation and coding schemes) are saved into a training and validation dataset for comparison with actual values subsequently inputted and outputted from the ML network. According to one embodiment, the training and validation dataset is created automatically without manual intervention by logging the remote and local environmental and carrier signal statistics as mentioned above. This dataset is then used to train the ML network. If new conditions occur, additional data may be added to this dataset during the presence of the new conditions for further training, such as exceptional storm events, solar alignments in a satellite network, or a high physical traffic period in a mobile network.

Training may occur over a period of time sufficient to realize most of the common signal conditions of a link. For example, in a geostationary satellite network at least a single day of data should be collected to ensure that any diurnal effects are mitigated. A low earth orbit system applying this system may operate for several days to provide opportunities for satellites to transit the sky from a number of angles. Conversely, a small mobile wireless network operating inside a structure with a low time of flight (distance between terminals) may only require a few hours or even minutes of tuning before the network stabilizes and begins producing acceptable results.

Once the ML network is trained to produce acceptable results, the ML network is configured to select a modulation and coding scheme corresponding to the SNR at the remote/receiving device of the communication link and input values of the environmental and carrier signal parameters at the local and remote devices. Initial modulation and coding schemes selected by the ML network may be too aggressive for some conditions experienced by the communications system as the ML network has not been trained to account for link quality effects (such as noise or distortion).

Once the ML network has been trained to select the best modulation and coding scheme based on SNR (signal level) and environment, it may further be trained to avoid errors due to non-signal level factors, such as noise and interference. During this phase, the ML network is permitted to control the modulation and coding of the system while new training data is collected. If the modulation selected is too high during this initial training, it will generate frame errors, and the traditional system will take action to reduce modulation in one embodiment.

The data generated by these events including frame errors and link outages is then added to the training set. When a frame error is encountered while the ML network is operating the system, the correct modulation and coding scheme for that training data point is selected as one modulation and coding scheme lower than the modulation and coding scheme that was actually selected by the ML network 154 according to one embodiment. This example causes the ML network to become slightly more conservative in its estimates each time the ML network suggests too aggressive of a modulation and coding scheme. The ML network may thereafter control the modulation and coding during subsequent transmissions to generate additional data for the training dataset.

Once the ML network has been trained to the unique characteristics of the communications link and a data training dataset has been generated, the ML network is able to select the modulation and coding scheme of the communications link by having the input data of the remote and local environmental and carrier signal parameters inputted to it. The process for the ML network to generate a modulation and coding scheme based upon input values is relatively lightweight from a processing requirements viewpoint compared to the backpropagation performed during training of the ML network.

In one embodiment, the ML selection evaluation process 158 in FIG. 9 continues to control retraining requirements during operation. For example, if environmental conditions occur that were not encountered during initial training (i.e., it is unlikely that the ML network can be trained under all possible environmental conditions such as clear skies, hurricane force winds, snow, and rain), the ML network may incorrectly choose an overly aggressive modulation and coding scheme leading to errors. When this occurs above an acceptable rate (e.g., 1/10,000 uncorrectable frames or 1E-5), the analytic modulation and coding scheme selector 160 is given control by the evaluation process 158 to select modulation and coding schemes, new training data is collected reflecting these new untrained situations, and the ML network is retrained using the first and second steps discussed above to add the new conditions to its training set. This example training process slowly adapts the ML network to select modulation and coding schemes of increased accuracy for all reasonable conditions in the communications link.

At times when the ML selection evaluation process 158 switches control from the ML network to a backup system such as analytic modulation and coding scheme selector 160, it indicates that additional training of the ML network may result in more accurate results with respect to modulation and coding scheme selection and that a new artifact in the environment may exist and need to be investigated. Notifying the operations teams when these control switch events occur could be used to alert the operator that a significant change occurred in a well-trained network. If retraining events are suddenly occurring in a network that has operated flawlessly for 6 months, it is possible that something important with respect to the communications system has changed and needs investigation. These alerts may be used to identify modems that are beginning to fail, antenna and amplifiers that are approaching end of life or other issues.

Figure 11:
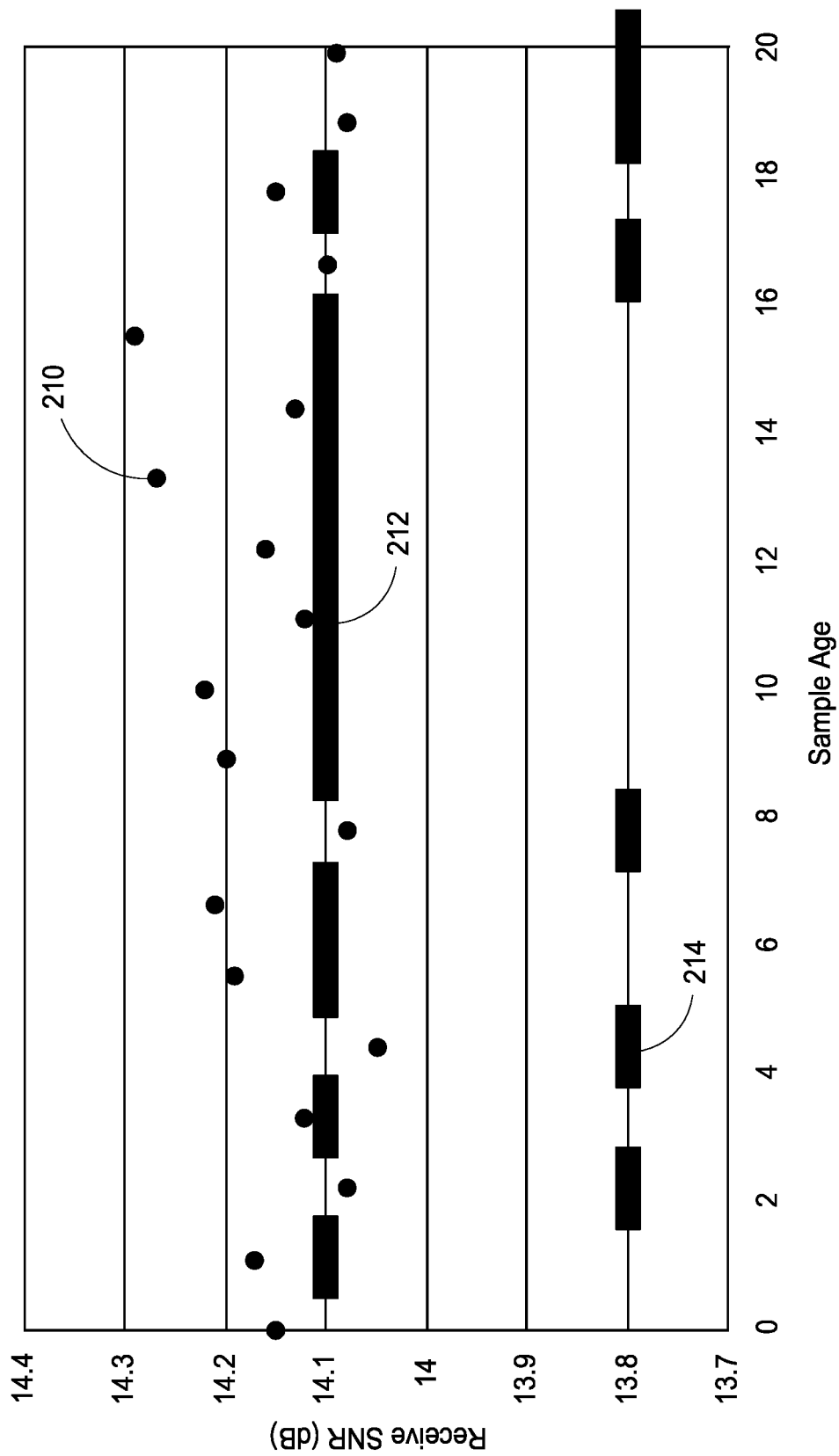
FIG. 11 is a graphical representation of selection of different modcods responsive to different input data.

Referring to FIG. 11, the resulting performance of an example device using an ML network to select modulation and coding schemes is shown. The input SNR measurements 210 of the receiving communications device are processed by the ML network to generate different SNR requirements 212, 214 for the input data. In some embodiments, the SNR requirements 212, 214 may be used to select the highest modulation and coding schemes having associated SNRs below the SNR requirements 212, 214, for example using Table A as discussed above. In other embodiments, the ML network is configured to output a selected modulation and coding scheme directly based upon inputted data.

In some embodiments, the communications devices of a given communications system may be asymmetric or symmetric. In symmetric embodiments, the controller of each of the local and remote communications devices is configured to select modulation and coding schemes to be used for transmissions from the respective communications device. In another embodiment, one of the communications devices of the communications system may have increased resources or processing capabilities compared with the other communications device of the system and the one of the communications devices may be configured to select separate modulation and coding schemes using the methods described above for each of the communications devices.

For example, the modulation and coding scheme selector of a local communications device may be configured to determine one modulation and coding scheme for use by the local communications device for transmissions and to process data associated with communications from the remote communications device to select another modulation and coding scheme to be used by the remote communications device for subsequent transmissions to the local communications device. The local communications device communicates the selected modulation and coding scheme to the remote communications device for use in subsequent transmissions to the local communications device.

As discussed above, some aspects of the disclosure described herein are directed to systems and methods that predict the most efficient modulation and coding scheme achievable in a communication system based on one or more carrier signal parameters, such as historical information, frame errors and signal levels including SNR. Some embodiments of the disclosure utilize environmental data regarding environmental conditions or parameters in the environment of the communications devices of the communications system. Some embodiments of the apparatus and methods of the disclosure account for one or more environmental parameters in a transmit path to select a modulation and coding scheme, such as: dynamic structural deflection due to wind, snow, rain, or ice, amplifier induced carrier distortion, interference from cross carrier intermodulation, carrier attenuation from precipitation, changes in multipath interference, and variation of orientation and position. Accounting for carrier signal and/or environmental parameters allows higher spectral efficiency to be achieved in a particular communication channel compared with conventional methods.

Each communications device may have an independent controller that is configured to control the transmit modulation and coding scheme of the respective device. In networks with more than two terminals, the ML network may calculate a recommended modulation and coding scheme for communications from a given local terminal to each of the remote terminals. In multicast networks, which are networks where one terminal transmits the same information to multiple receivers (e.g., television), the modulation and coding scheme of the weakest receiver may be used for the transmission.

According to example embodiments herein, the communications system is configured to determine if unexpected changes have impacted a communications link which could be used for generation of alarms that are more sophisticated than power level alarms that pervade the field.

In one embodiment, increased or maximum spectral efficiency is achieved through selection of a modulation and coding scheme using bit-error statistics. Additional aspects described herein are directed towards training a modulation and coding scheme selection system with internal and external inputs through a machine learning (ML) network and use of a trained ML network with a large number of inputs to choose modulation schemes during communications in the communications system. A trained ML network models complex environmental effects without use of an analytical solution in some embodiments.

Some of the example methods described herein may be used to train the ML network to develop a model that incorporates factors that cannot be readily solved analytically. Further aspects of the disclosure are directed towards automatically generating training data without user input, for example using analytical selection of modulation and coding schemes, and use of the training data generated by the other modcod selection to train or retrain the ML network. An ML network configured as described herein and trained with sufficient data achieves a higher overall spectral efficiency under a wider array of conditions.

Some of the disclosed embodiments integrate with directional control antenna systems to maintain carrier quality and identify and alarm against man-made changes to the environment (e.g., sudden addition of noise or incorrectly configured carriers in the spectrum). Some embodiments provide increased efficiency in communications that may result in reduced power consumption in systems that utilize batteries by lowering power consumption and reducing noise on the network and adjacent channels. In addition, some embodiments provide improved handoff between wireless systems allowing them to come to convergence faster which is important as larger more bandwidth-intensive applications are employed, and cell networks are reduced in size to improve capacity. Some disclosed embodiments improve operation of satellite and terrestrial network resources all around and deliver more bandwidth per hertz of allocated spectrum.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A communications system comprising:
   a first communications device configured to transmit a communications signal using a first communications parameter at a first moment in time, wherein the communications signal is an electromagnetic signal;
   processing circuitry configured to:
   access a value indicative of a signal to noise ratio of the communications signal received at a second communications device after the transmission of the communications signal from the first communications device of the communications system at the first moment in time;
   access data regarding occurrence of errors during the communication of the communications signal from the first communications device to the second communications device using the first communications parameter;
   use the data regarding occurrence of errors to select one of a plurality of different adjustments; and
   use the value and the one adjustment to select a second communications parameter of the communications signal;
   wherein the first communications device is configured to transmit the communications signal using the second communications parameter at a second moment in time after the first moment in time; and
   wherein the first and second communications parameters are different.

2. The system of claim 1 wherein the processing circuitry is configured to select another of the different adjustments and to use the another adjustment to select the communications parameter of the communications signal transmitted at a third moment in time after the second moment in time.

3. The system of claim 1 wherein the processing circuitry is configured to use machine learning to select the communications parameter of the communications signal transmitted at a third moment in time after the second moment in time.

4. The system of claim 1 further comprising a modulator configured to modulate a carrier signal, and the communications parameter comprises a modulation and coding scheme of the modulator.

5. The system of claim 1 wherein the data regarding occurrence of errors includes frame errors during the transmission of the communications signal.

6. The system of claim 1 wherein the communications signal is transmitted via a communications link, and the data regarding occurrence of errors includes outages in the communications link during the transmission of the communications signal.

7. The system of claim 1 wherein the processing circuitry is configured to access a plurality of additional values indicative of the signal to noise ratio of the communications signal received at the second communications device at a plurality of additional moments in time, to use the additional values to determine a standard deviation of the signal to noise ratio, and to use the standard deviation to select the one adjustment.

8. The system of claim 1 wherein the processing circuitry is configured to use the data regarding occurrence of errors to generate an alert to an operator.

9. A communications system comprising:
processing circuitry configured to:
  access data regarding a communications signal transmitted from a first communications device of a communications system to a second communications device of the communications system at a first moment in time;
  process the data using machine learning; and
  change a communications parameter of the communications signal transmitted from the first communications device to the second communications device at a second moment in time as a result of the processing.

10. The system of claim 9 wherein the data is indicative of the communications signal received at the second communications device.

11. The system of claim 9 wherein the data is indicative of a signal to noise ratio of the communications signal.

12. The system of claim 9 further comprising a sensor configured to monitor an environmental parameter of an environment about the one of the first and second communications devices and to generate an output indicative of the environmental parameter, and wherein the processing circuitry is configured to process the output using the machine learning to change the communications parameter.

13. The system of claim 12 wherein the environmental parameter is indicative of wind in the environment.

14. The system of claim 12 wherein the environmental parameter is indicative of precipitation in the environment.

15. The system of claim 12 wherein the sensor is configured to monitor the environmental parameter of the environment about the first communications device.

16. The system of claim 12 wherein the sensor is configured to monitor the environmental parameter of the environment about the second communications device.

17. The system of claim 9 further comprising a modulator configured to modulate a carrier signal, and the communications parameter comprises a modulation and coding scheme of the modulator.

18. The system of claim 9 wherein the processing circuitry is configured to use data regarding uncorrectable frames in the communications signal to change the communications parameter of the communications signal transmitted from the first communications device to the second communications device at a third moment in time after the second moment in time.

19. The system of claim 9 further comprising a sensor configured to monitor a parameter that is independent of the communications signal and to generate an output that is indicative of the monitored parameter, and wherein the processing circuitry is configured to process the output using the machine learning.

20. The system of claim 9 wherein the communications parameter is a modulation and coding scheme, and further comprising a modulator configured to use a first modulation and coding scheme to modulate a carrier signal to generate the communications signal at the first moment in time and to use a second modulation and coding scheme to modulate the carrier signal to generate the communications signal at the second moment in time, and wherein the first and second modulation and coding schemes are different.

21. The system of claim 9 wherein the communications parameter is a modulation and coding scheme, the processing circuitry is configured to change the communications parameter from use of a first modulation and coding scheme to transmit the communications signal at the first moment in time to use of a second modulation and coding scheme to transmit the communications signal at the second moment in time, and the first and second modulation and coding schemes are different.

22. The system of claim 9 wherein the communications signal is communicated using a single communications link between the first and second communications devices at the first and second moments in time.

23. A communications system comprising:
processing circuitry configured to:
  access data regarding a communications signal transmitted from a first communications device of a communications system to a second communications device of the communications system at a first moment in time;
  use the data regarding the communications signal to change a communications parameter of the communications signal transmitted from the first communications device to the second communications device at a second moment in time after the first moment in time; and
  use the data to train machine learning to control the communications parameter of the communications signal transmitted from the first communications device to the second communications device after the second moment in time.

24. The system of claim 23 wherein the data is indicative of the communications signal received at the second communications device.

25. The system of claim 23 wherein the data is indicative of a carrier parameter of the communications signal.

26. The system of claim 23 wherein the data is indicative of a modulation and coding scheme of the communications signal.

27. The system of claim 23 further comprising a sensor configured to monitor an environmental parameter of an environment about the one of the first and second communications devices and to generate an output indicative of the environmental parameter, and wherein the processing circuitry is configured to use the output to train the machine learning.

28. The system of claim 27 wherein the sensor is configured to monitor the environmental parameter of the environment about the first communications device.

29. The system of claim 23 further comprising a modulator configured to modulate a carrier signal to generate the communications signal, and the communications parameter comprises a modulation and coding scheme of the modulator.

30. The system of claim 23 further comprising storage circuitry configured to store the data over time to provide statistical data, and wherein the processing circuitry is configured to use the statistical data to train the machine learning.

31. The system of claim 23 wherein the processing circuitry is configured to use the machine learning to change the communications parameter of the communications signal at a third moment in time after the second moment in time.

32. A communications system comprising:
a first communications device configured to transmit a communications signal using a first communications parameter at a first moment in time;
processing circuitry configured to:
access a value indicative of a signal to noise ratio of the communications signal received at a second communications device after the transmission of the communications signal from the first communications device of the communications system at the first moment in time;
select one of a plurality of different adjustments; and
use the value and the one adjustment to select a second communications parameter of the communications signal;
wherein the first communications device is configured to transmit the communications signal using the second communications parameter at a second moment in time after the first moment in time;
wherein the first and second communications parameters are different; and
wherein the processing circuitry is configured to use machine learning to select the communications parameter of the communications signal transmitted at a third moment in time after the second moment in time.

33. The system of claim 32 wherein the processing circuitry is configured to use the machine learning to select the communications parameter following training of the machine learning.

34. The system of claim 32 wherein the processing circuitry is configured to monitor errors of the communications signal transmitted after the third moment in time, and to use another value and another adjustment to change the communications parameter of the communications signal transmitted from the first communications device to the second communications device at a fourth moment in time as a result of the monitoring of the errors.

35. The system of claim 32 wherein the processing circuitry is configured to monitor errors of the communications signal transmitted after the third moment in time and to retrain the machine learning as a result of the monitoring of the errors.

* * * * *